United States Patent [19]
Tricini

[11] 3,982,729
[45] Sept. 28, 1976

[54] BACK-UP SEAL FOR DIAPHRAGM VALVE
[75] Inventor: John D. Tricini, Greensburg, Pa.
[73] Assignee: Kerotest Manufacturing Corporation, Pittsburgh, Pa.
[22] Filed: Nov. 18, 1974
[21] Appl. No.: 524,821

Related U.S. Application Data
[63] Continuation of Ser. No. 451,143, March 14, 1974, which is a continuation of Ser. No. 349,768, April 10, 1973, abandoned.

[52] U.S. Cl.............................. 251/214; 251/335 A; 277/108
[51] Int. Cl.[2]......................................... F16K 31/44
[58] Field of Search.................. 251/61, 61.2, 61.3, 251/61.4, 128, 213, 214, 221, 225, 335, 335 A, 222, 223; 277/102, 108, 237; 137/246.16

[56] References Cited
UNITED STATES PATENTS

| | | | |
|---|---|---|---|
| 1,881,269 | 10/1932 | Evans et al. | 251/214 |
| 1,890,505 | 12/1952 | Forbes | 251/335 A |
| 1,995,395 | 3/1935 | Mohr | 251/225 |
| 2,032,316 | 2/1936 | Cotton | 251/335 |
| 2,618,458 | 11/1952 | Fosbender | 251/335 |
| 2,638,307 | 5/1953 | Fortune | 251/335 A |
| 2,699,801 | 1/1955 | Schleyer | 251/335 |
| 2,699,916 | 1/1955 | Johnson | 137/246.16 |
| 2,746,478 | 5/1956 | Johnson | 137/246.16 |
| 2,856,151 | 10/1958 | Peters | 251/335 |
| 2,880,620 | 4/1959 | Bredtschneider | 251/335 |
| 2,912,867 | 11/1959 | Gallant | 251/335 |
| 2,986,372 | 5/1961 | Yocum | 251/214 |
| 3,257,095 | 6/1966 | Siver | 251/214 |

OTHER PUBLICATIONS
Brochure – ITT Grinnell – Diaphragm Valves for Nuclear Services, Grinnell Valve Division, 225 N. Front St., Wrightsville, Pa. 17638.

*Primary Examiner*—Martin P. Schwadron
*Assistant Examiner*—G. Walton
*Attorney, Agent, or Firm*—Stanley J. Price, Jr.

[57] ABSTRACT

The diaphragm valve has a valve body portion with a chamber therein. The chamber has an open top portion and an inlet and outlet communicating therewith. The valve body has a valve seat in the chamber. The valve member is positioned in overlying relation with the valve seat and is arranged to control the flow of fluid through the chamber. A yoke member connected to the valve body within the upper portion of the valve chamber has an axial passageway therethrough. A bonnet having a passageway therethrough is coaxially aligned within the yoke member. A valve stem is arranged for reciprocal movement within the yoke member and bonnet passageway. A diaphragm assembly is positioned within the valve chamber between the valve stem and the valve member. A spring urges the valve member upwardly against the underside of the diaphragm assembly to open the valve. A packing ring surrounds the valve stem and is positioned within an annular recessed portion of the bonnet passageway. A follower member surrounds the valve stem and overlies the packing ring in the recessed portion. A bearing plate surrounding the valve stem in the yoke member passageway abuts the top portion of the follower member. Bolt means threadably engaged within bores of the yoke member abut the bearing plate and apply preselected compressive forces thereto. The compressive forces are transmitted from the bearing plate through the follower to the packing ring to thereby maintain a fluid and pressure tight seal between the bonnet and the valve stem in the bonnet passageway. The yoke member, together with the packing ring, follower member and the bearing plate prevent the expulsion of broken valve components out of the valve in the event of excessive pressure build-up within the valve chamber.

9 Claims, 1 Drawing Figure

U.S. Patent   Sept. 28, 1976   3,982,729
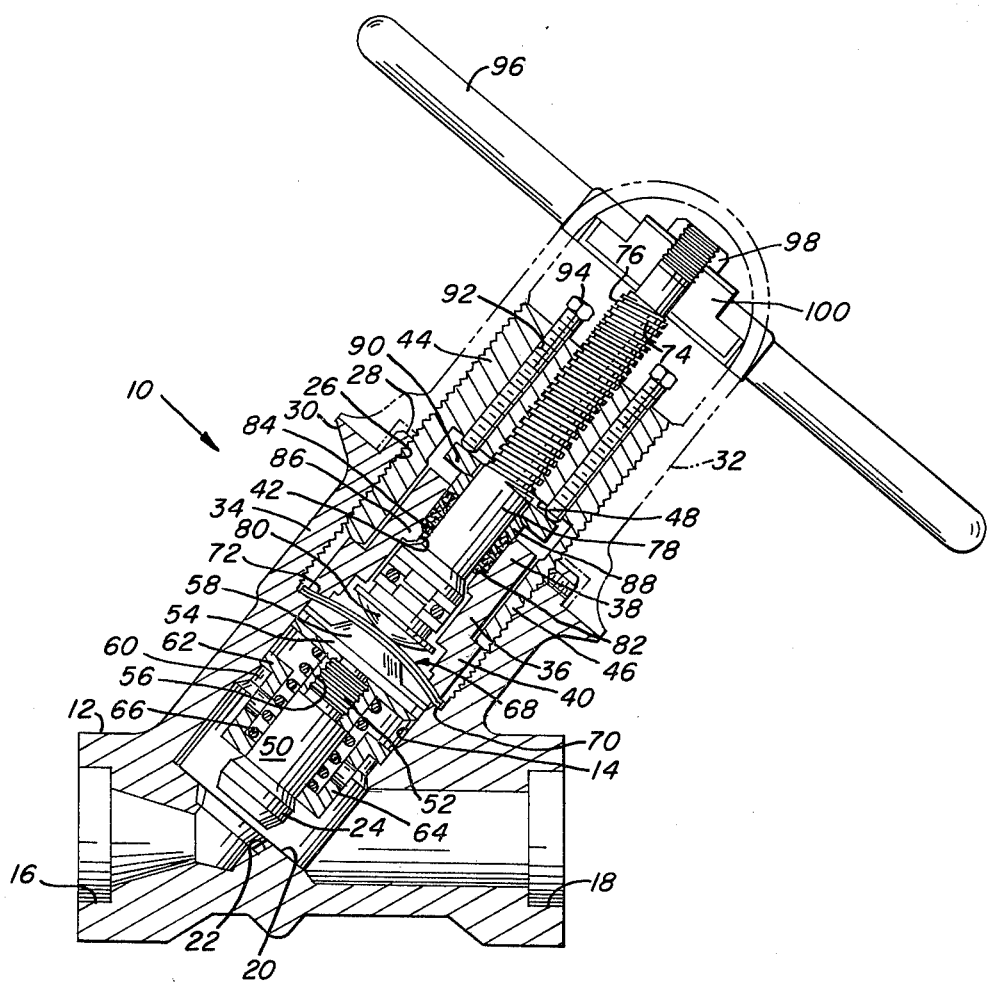

BACK-UP SEAL FOR DIAPHRAGM VALVE

CROSS REFERENCE TO RELATED APPLICATIONS

This application is a continuation application of Ser. No. 451,143, entitled "Back-Up Seal For Diaphragm Valve," filed Mar. 14, 1974, which in turn is a continuation application of application Ser. No. 349,768 filed on Apr. 10, 1973, now abandoned.

BACKGROUND OF THE INVENTION

1. Field of the Invention

This invention relates to a diaphragm valve, and more particularly to a diaphragm valve having a back-up seal which prevents both the leakage of fluid and the expulsion of fractured valve components out of the valve.

2. Description of the Prior Art

In valves controlling the flow of fluids, particularly at high pressures, it is necessary to provide suitable sealing means which prevent the leakage of fluid out of the valve and furthermore prevent the expulsion or blowout of internal valve components out of the valve which would otherwise present a risk of property damage and injury to operating personnel. U.S. Pat. Nos. 2,061,028; 2,144,754; 2,647,538; 2,925,987; 2,983,480; 3,084,901 and 3,523,551 illustrate and describe valves having sealing arrangements, such as diaphragms, bellows, O-rings, packing materials and other suitable sealing devices to prevent leakage around the valve stem and through the open end portion of the valve chamber.

U.S. Pat. No. 2,647,538 discloses a packing arrangement positioned between a retainer sleeve member and a stem member provided within a chamber of a valve for controlling the flow of steam or hot water. The packing is held in place by the packing retainer and is compressed by a ring. The ring is urged downwardly by a coil spring and the compression of the spring is adjustable by a packing nut threaded into the upper portion of the retaining sleeve. The packing functions to prevent the leakage of steam from the valve chamber along the valve stem. The packing arrangement is contained entirely within the body of the valve. To vary the compressive forces applied by the spring to the packing, the entire valve must be disassembled and the packing nut adjusted by a suitable tool to increase or decrease the compressive forces exerted by the spring on the packing.

U.S. Pat. No. 3,237,917 provides rings of packing material surrounding the valve stem within an annular recess forming part of the valve chamber. The packing is supported against the valve chamber by annular ring support members and is compressed by a follower upon which a gland bears. The gland is suitably engaged to the body of the valve within the valve chamber. The gland exerts a predetermined amount of compression upon the follower which, in turn, is transmitted to the packing. A lock nut threadably engaged within the valve chamber to the gland maintains the gland immovable within the chamber and fixed relative to the follower. Thus the gland is maintained immovable with the valve chamber. Consequently, the compressive forces applied by the gland to the follower and transmitted to the packing ring cannot be varied.

U.S. Pat. No. 3,523,551 illustrates and describes a faucet capped by a stuff nut provided with a cylindrical recess surrounding the valve stem and adapted to receive a sealing assemblage. The sealing assemblage includes an O-ring seal confined within the recess between a bearing member and a disc. A compression spring acting through the bearing member exerts a downwardly directed force against the O-ring seal. The compressive force of the spring transmitted to the O-ring seal remains a constant predetermined value and is not capable of adjustment externally of the faucet chamber.

There is need for a diaphragm type valve provided with a sealing arrangement to prevent the leakage of fluid from the valve chamber and, in turn, prevent the expulsion of broken valve components out of the valve. Furthermore, there is need for a diaphragm valve having a back-up seal contained internally within the valve by the application of compressive forces thereto. The compressive forces applied internally within the valve chamber must be adjustable externally of the valve to permit the application of forces at selected levels as needed to resist the fluid pressure in the pipeline and wear upon the sealing members.

SUMMARY OF THE INVENTION

The present invention provides a back-up seal for a diaphragm valve having a valve body with a valve chamber therein. The valve chamber has an open top portion and inlet and outlet openings communicating with the chamber. There is a valve seat in the chamber between the inlet and outlet openings and a valve member is positioned in the chamber in overlying relation with the valve seat and is arranged to control the flow of fluid through the valve seat. A yoke member is connected to the valve body within the upper portion of the chamber and is arranged for vertical adjustment within the chamber. The yoke member is positioned in overlying relation with the chamber top opening and is arranged to close the chamber. The yoke member has an axial passageway therethrough. The valve member has a cap member axially aligned in the chamber of the valve body. A plurality of flexible diaphragms, arranged in overlying relation to form a unitary composite diaphragm are in turn collectively positioned in overlying relation with the valve member. The cap member top portion is arranged to abut the bottom surface of the composite diaphragm. A bonnet having an axial passageway therethrough is coaxially aligned with the yoke member and is positioned in overlying relation with the composite diaphragm. The bonnet is urged into abutting relation with the composite diaphragm so that the composite diaphragm seals the bonnet passageway from fluid communication with the chamber.

A valve stem arranged for reciprocal movement in the yoke member extends through the bonnet passageway. The valve stem has a lower end portion abutting the top surface of the composite diaphragm. The valve stem is operable to reciprocate axially in the bonnet passageway to thereby transmit movement through the composite diaphragm to the valve member. The bonnet passageway has an annular recessed portion therein and is positioned above the valve stem end portion. The bonnet passageway is sealed to prevent the flow of fluid upwardly through the bonnet passageway and to prevent expulsion of the composite diaphragm and the valve member out of the valve body.

The sealing means are positioned in the annular recessed portion of the bonnet passageway and surround the valve stem extending through the bonnet passageway. The sealing means are arranged to permit axial movement of the valve stem in the bonnet passageway. Compression means for engaging the sealing means in a fluid and pressure type seal are arranged between the bonnet and the valve stem in the annular recessed portion. The compression means positioned in the yoke member are operable to permit external adjustment of the compressive forces exerted upon the sealing means.

In the illustrated embodiment of this invention, the sealing means positioned in the annular recessed portion of the bonnet passageway include a wire reinforced packing ring that surrounds the valve stem. A follower member positioned in the annular recessed portion abuts the top surface of the packing ring and extends around the valve stem. A bearing plate positioned in the yoke member passageway abuts the top portion of the follower member and surrounds the valve stem. A plurality of bolt means arranged in bores of the yoke member are suitably advanced therethrough to apply axial compressive forces upon the bearing plate. The compressive forces are transmitted through the bearing plate to the follower ring and the packing ring so that the follower member and the packing ring are maintained in a fluid and pressure tight seal between the bonnet and the valve stem in the annular recessed portion.

In the event of compressive fluid pressure build-up in the pipeline resulting in the breakage of internal valve components, the yoke member functions to prevent the expulsion of the broken components out of the chamber. The bolt means are arranged in the yoke member to permit external adjustments of the compressive forces applied internally by the bolt means to the sealing means in the bonnet passageway. Furthermore, a lower annular ring portion of the yoke member, arranged between the valve body and the bonnet, transmits compressive forces directed downwardly through the bonnet to thereby provide a fluid and pressure tight seal between the bonnet and the valve body portion.

Accordingly, the principal object of this invention is to provide a back-up seal for a diaphragm valve in which a fluid and pressure tight seal arranged within the valve chamber prevents the expulsion of fluid and broken valve components out of the valve chamber.

These and other objects of this invention will be more completely described and disclosed in the following specification, the accompanying drawings and the appended claims.

BRIEF DESCRIPTION OF THE DRAWING

The FIGURE is a view in side elevation, partially in section of the diaphragm valve in open position.

DESCRIPTION OF THE PREFERRED EMBODIMENTS

Referring to the drawing there is illustrated a diaphragm valve generally designated by the numeral 10 having a Y-shaped body portion 12 with an elongated chamber 14 therein. Inlet and outlet openings 16 and 18 communicate with the chamber 14 for the flow of fluid therethrough. The chamber 14 has a base portion 20 with an annular valve seat 22. A valve member 24 is positioned in overlying relation with the valve seat 22 and is arranged to control the flow of fluid between openings 16 and 18. The chamber 14 has an open end portion 26 with an annular shoulder portion 28 therearound. A flange portion 30 projects radially outwardly from the shoulder portion 28 and is arranged to receive the optional cap member 32 indicated in phantom on the drawing.

The valve body portion 12 has an upper internally threaded portion 34 in which a bonnet 36 is axially aligned. The bonnet 36 includes upper and lower annular ring portions 38 and 40 forming a bonnet passageway 42 therethrough. A yoke member 44 has a lower annular ring portion 46 positioned in the recess between the valve body threaded portion 34 and the bonnet 36. The yoke member 44 has an externally threaded surface which engages the internal threads of the threaded portion 34 and the cap member 32 to thereby align the yoke member 44 axially within the chamber 14. An annular surface 48 of the yoke member 44 closes the open upper end portion 26 of the chamber 14.

The valve member 24 has a spindle portion 50 extending upwardly therefrom. The spindle 50 has an axial threaded end portion 52 in its upper portion. The valve member 24 is positioned in the chamber 14 with the spindle 50 extending upwardly therefrom. A spindle cap 54 has an axial threaded bore 56 and an enlarged upper portion 58. The spindle threaded end portion 52 is threadably engaged in the bore 56 of the spindle cap 54 to form a spindle extension that extends into the passageway 42 of the bonnet 36.

The valve body portion 12 has an inwardly extending shoulder portion 60 in chamber 14 on which the lip 62 of a cup-shaped member 64 is positioned. The spindle 50 extends upwardly through the axial opening in the cup-shaped member 64 and a spring 66 is positioned around the spindle 50. The spring 66 abuts the bottom portion of the cup-shaped member 64 at one end and abuts the spindle cap enlarged portion 58 adjacent the other end to thereby urge the spindle 50 and valve member 24 upwardly away from the valve seat 22. The spring 66 thus urges the valve member 24 toward an open position.

The spindle cap enlarged portion 58 is arranged to abut a flexible metal diaphragm assembly 68 comprising a plurality of diaphragms arranged in overlying relation to form a unitary composite diaphragm. The diaphragm assembly 68 has a generally circular disc like configuration and has an outer circumferential edge that abuts the top annular edge 70 of the body portion 12. The lower annular edge 72 of bonnet 36 abuts the upper annular edge of the diaphragm assembly 68. Thus the diaphragm assembly 68 provides a fluid tight seal within the bonnet passageway 42 between the bonnet 36 and the chamber 14.

A valve stem 74 is suitably secured in the threaded axial passageway 76 of the yoke member 44 and includes a stem head 78 positioned in the bonnet passageway 42 which is axially aligned with the yoke member passageway 76. The stem head 78 includes an enlarged head portion 80 positioned within the end portion of the bonnet passageway 42. The enlarged head portion 80 abuts the diaphragm assembly 68 opposite the cylindrical upper portion 58 of the spindle cap 54.

Annular recessed portion 82 is formed in the bonnet passageway 42 within the upper end of the chamber 14 between the upper annular ring portion 38 of the bonnet 36 and the stem head 78 of the valve stem 74. A wire reinforced packing ring 84 is positioned within the recessed portion 82 spaced above the inturned annular shoulder portion 86 of the bonnet 36. The packing ring 84 surrounds the stem head 78 and permits reciprocating movement of the stem head 78 in the bonnet passageway 42. The packing ring 84 may include a plurality of individual packing rings positioned in overlying relationship in the recessed portion 82 between the bonnet upper annular ring portion 38 and the valve stem head 78. A metallic circular follower member 88 is positioned in abutting relationship with the top surface of the packing ring 84 within the annular recess portion 82. A plate member 90 is positioned in the lower portion of the yoke member passageway 76 and surrounds the stem head 78 of the valve stem 74. The top surface of the plate member 90 is positioned adjacent to and spaced from the annular surface 48 of the yoke member 44 with the lower surface thereof bearing upon the follower member 88.

The yoke member 44 has a plurality of internally threaded bores 92 spaced radially of the yoke member passageway 76 and extending longitudinally through the body portion of the yoke member 44. Suitable fastening means such as bolts 94 are arranged to engage the threaded portions of the bores 92. The bolts 94 are threadably advanced through the bores 92 and the yoke member 44 and protrude from the bores 92 below the surface 48 to abut the top surface of the plate member 90. The bolts 94 abutting the plate member 90 apply compressive forces thereto as they are threadably advanced through the bores 92.

Compressive forces applied by the bolts 94 to the plate member 90 are transmitted through the follower member 88 to the packing ring 84. The compressive forces applied by the bolts 94 and transmitted to the packing ring 84 expand the packing ring 84 both radially inwardly and outwardly within the annular recessed portion 82. Thus the packing ring 84 provides a fluid and pressure tight seal between the outer sealing surface of the stem head 78 and the inner sealing surface of the bonnet 38 in the annular recessed portion 82. By adjusting the bolts 94 externally of the valve body portion 12 compressive forces at preselected levels may be transmitted through the plate member 90 to the follower member 88 and the packing ring 84 to maintain a fluid and pressure tight seal within the bonnet passageway 42. Furthermore, the yoke member annular ring portion 46 positioned within the chamber 14 between the valve body threaded portion 34 and the upper annular ring portion 38 of the bonnet 36 transmits compressive forces downwardly through the bonnet 36 to the lower annular ring portion 40 of the bonnet 36. With this arrangement, the lower annular edge 72 of the lower annular ring portion 40 is maintained in abutting contact with the outer edge portion of the top surface of the diaphragm assembly 68 to thereby retain the edge portion of the diaphragm assembly 68 between the annular edges 70 and 72. Thus a fluid tight seal is provided within the bonnet passageway 42 between the bonnet 36 and the chamber 14.

A handwheel 96 is secured to the valve stem 74 by a nut 98 and an impactor 100. Rotation of the handwheel 96 rotates the valve stem 74 within the yoke member passageway 76 and the bonnet passageway 42 to advance the enlarged head portion 80 and the diaphragm assembly 68 downwardly. The downward movement of the enlarged head portion 80 and diaphragm assembly 68 is transmitted through the spindle cap 54 and spindle 50 to the valve member 24. Thus the valve member 24 is moved into abutting closed relation with the valve seat 22 by rotation of the handwheel 96. The spring 66 moves the valve member 24 away from the valve seat 22 when the handwheel 96 is rotated to advance the enlarged head portion 80 and the diaphragm assembly 68 upwardly within the bonnet passageway 42.

The yoke member 44 threadably engaged to the valve body threaded portion 34 and the valve stem 74 contains the packing ring 84, follower member 88 and plate member internally within the valve chamber 14. The bolts 94 function to permit external adjustments in the compressive forces applied to the follower plate 90 through which the compressive forces are transmitted to the follower member 88 and the packing ring 84. Therefore, the bolts 94 may be advanced to varying depths beyond the annular surface 48 as required to sealingly maintain the members 84, 88 and 90 in the annular recessed portion 82 and thereby resist the forces exerted upon the valve 10 by the fluid in the pipeline. Should the pressure exerted by the fluid in the pipeline be so great that the spindle 50, the valve stem head 78, packing ring 84, follower member 88 or the plate member 90 fracture, the broken parts will be contained by the yoke member 44 internally within the valve body portion 12 and will not be expelled outwardly therefrom.

Thus the hereinabove described valve provides a sealing arrangement which not only prevents the leakage of fluid around the valve stem 74, which would otherwise result in deterioration of the valve components, but also prevents the expulsion of corrosive fluids under high pressure from the interior of the valve 10. Furthermore, the sealing arrangement functions to contain internally within the valve, valve components which have fractured under the stress exerted by the flow of high pressure fluid through the valve chamber 14 or extreme pressure build-up therein. As a result of this feature, the risk of property damage and personal injury due to the blowout of fractured valve components is substantially reduced.

According to the provisions of the patent statutes, I have explained the principle, preferred construction, and mode of operation of my invention and have illustrated and described what I now consider to represent its best embodiments. However, I desire to have it understood that, within the scope of the appended claims, the invention may be practiced otherwise than as specifically illustrated and described.

I claim:
1. A diaphragm valve comprising,
   a valve body having a chamber therein with an upper portion and a lower portion, said lower portion having inlet and outlet openings communicating with said chamber lower portion,
   a valve seat in said chamber lower portion between said inlet and outlet openings,
   a valve member positioned in said chamber lower portion in overlying relation with said valve seat and arranged to control the flow of fluid through said chamber lower portion,
   a flexible diaphragm positioned in said chamber in overlying relation with said valve member and arranged to seal said chamber lower portion from said chamber upper portion,
   a bonnet positioned in said chamber upper portion in overlying abutting relation with said diaphragm, said bonnet having a passageway therethrough,
   a valve stem positioned in said bonnet passageway with a lower end abutting the top surface of said diaphragm, sealing means positioned in said bonnet passageway and surrounding said valve stem extending through said bonnet passageway, said sealing means operable to permit axial movement of said valve stem in said bonnet passageway and seal said bonnet passageway to prevent the flow of fluid upwardly therethrough, means to move said valve stem in said bonnet passageway to thereby transmit movement through said diaphragm to said valve member, a yoke member including a lower annular end portion, said bonnet includes an outer annular shoulder portion abutting said yoke member lower annular end portion, said bonnet including an annular bottom portion positioned in overlying relation with said diaphragm, said yoke member annular end portion threadably engaged to said valve body and arranged to urge said bonnet into abutting relation with said diaphragm.

2. A diaphragm valve as set forth in claim 1 which includes, compression means extending into said bonnet passageway, said compression means arranged to urge said sealing means into sealing relation between said bonnet passageway and said valve stem.

3. A diaphragm valve as set forth in claim 1 in which said sealing means for said bonnet passageway and valve stem includes, wire reinforced packing ring means positioned in said bonnet passageway and surrounding said valve stem, a follower member positioned in said bonnet passageway in abutting relation with the top surface of said packing ring means and surrounding said valve stem, said follower member arranged to transmit compressive forces to said packing ring means so that said packing ring means is maintained in sealing relation between said bonnet passageway and said valve stem.

4. A diaphragm valve as set forth in claim 1 in which said valve member includes, a body portion with a threaded recess therein, a spindle having a threaded end portion threadably engaged in said body portion threaded recess, resilient means supported in said valve body chamber lower portion and urging said valve member body portion into abutting relation with the underside of said diaphragm.

5. A diaphragm valve as set forth in claim 1 in which, said yoke member is connected to said valve body in overlying relation with said bonnet, said yoke member having an axial passageway therethrough, said valve stem extending through said yoke member axial passageway.

6. A back-up seal for a diaphragm valve as set forth in claim 5 in which said yoke member includes, a lower annular end portion between said valve body and said bonnet, said yoke member lower annular end portion operable to transmit forces through said bonnet onto said flexible diaphragm to thereby provide a seal between said chamber upper portion and said chamber lower portion.

7. A diaphragm valve as set forth in claim 5, which includes, compression means extending into said bonnet passageway, said compression means arranged to urge said sealing means into sealing relation between said bonnet passageway and said valve stem, adjusting means extending through said yoke member into abutting relation with said compression means, said adjusting means arranged to exert a preselected compressive force on said compression means.

8. A back-up seal for a diaphragm valve as set forth in claim 7 in which said adjusting means includes, a plurality of longitudinally extending internally threaded bores in said yoke member, bolt means threadably engaged in said threaded bores and having end portions extending beyond said yoke member into contact with said compression means to thereby apply compressive forces through said compression means to said sealing means.

9. A back-up seal for a diaphragm valve as set forth in claim 8 in which, said bolt means extend outwardly of said yoke member, said bolt means being adjustable externally of said valve body to permit the application of preselected compressive forces upon said sealing means in said bonnet passageway.

* * * * *